(12) United States Patent
Kraemer et al.

(10) Patent No.: US 11,017,388 B2
(45) Date of Patent: *May 25, 2021

(54) CRYPTOGRAPHICALLY ASSURED ZERO-KNOWLEDGE CLOUD SERVICE FOR COMPOSABLE ATOMIC TRANSACTIONS

(71) Applicant: International Business Machines Corporation, Armonk, NY (US)

(72) Inventors: James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 579 days.

This patent is subject to a terminal disclaimer.

(21) Appl. No.: 15/080,678

(22) Filed: Mar. 25, 2016

(65) Prior Publication Data

US 2017/0278100 A1 Sep. 28, 2017

(51) Int. Cl.
*G06Q 20/38* (2012.01)
*G06Q 20/06* (2012.01)
(Continued)

(52) U.S. Cl.
CPC ..... *G06Q 20/38215* (2013.01); *G06Q 20/065* (2013.01); *G06Q 20/3678* (2013.01);
(Continued)

(58) Field of Classification Search
None
See application file for complete search history.

(56) References Cited

U.S. PATENT DOCUMENTS 6,115,744 A * 9/2000 Robins ............... H04L 29/06
709/203
8,875,234 B2 10/2014 D'Souza et al.
(Continued)

OTHER PUBLICATIONS

Goyal, V., et al., "An Algebraic Approach to Non-Malleability", 2014 IEEE 55th Annual Symposium on Foundations of Computer Science, Oct. 18-21, 2014, pp. 1-35.
(Continued)

*Primary Examiner* — Jacob C. Coppola
*Assistant Examiner* — Timothy Paul Sax
(74) *Attorney, Agent, or Firm* — Fleit Intellectual Property Law; Jon Gibbons (57) ABSTRACT

A trusted network based service running on a server, for example as a cloud server, includes receiving a request from a first user device and a second user device. The request includes one or more inputs to perform a transaction. Based upon the request, selecting one or more computational resources from a set of a plurality of computational resources using zero-knowledge verifiable computing. In response to receiving authorization from each of the computational resources that they are capable of performing the zero-knowledge verifiable computing transactions to carry out at least a portion of the request, executing the program using zero-knowledge verifiable computing to carry out the request using a zero-knowledge protocol to ensure privacy of the first user device and the second user device. Sending to the first user device and the second user device an output of the request.

18 Claims, 6 Drawing Sheets

(51) Int. Cl.
*G06Q 20/40* (2012.01)
*G06Q 20/36* (2012.01)
*H04L 9/06* (2006.01)
*H04L 9/32* (2006.01)
*H04W 12/02* (2009.01)
*H04L 29/06* (2006.01)

(52) U.S. Cl.
CPC ....... *G06Q 20/3821* (2013.01); *G06Q 20/401* (2013.01); *H04L 9/0637* (2013.01); *H04L 9/32* (2013.01); *H04L 63/0407* (2013.01); *H04W 12/02* (2013.01); *H04L 2209/56* (2013.01)

(56) References Cited

U.S. PATENT DOCUMENTS

| | | | | |
|---|---|---|---|---|
| 2003/0115376 | A1* | 6/2003 | Drobychev | G06Q 10/06 719/328 |
| 2003/0167329 | A1* | 9/2003 | Kurakake | H04L 47/15 709/226 |
| 2004/0205341 | A1* | 10/2004 | Brickell | G06F 21/445 713/168 |
| 2006/0129821 | A1* | 6/2006 | Zugenmaier | G06F 21/64 713/175 |
| 2009/0177591 | A1 | 7/2009 | Thorpe et al. | |
| 2012/0167164 | A1* | 6/2012 | Burgess | G06F 21/00 726/1 |
| 2015/0193602 | A1 | 7/2015 | Rogel et al. | |
| 2015/0205834 | A1* | 7/2015 | Keeton | G06F 16/14 707/714 |
| 2015/0269541 | A1* | 9/2015 | MacGregor | G06Q 20/10 705/39 |
| 2016/0335533 | A1* | 11/2016 | Davis | G06F 9/44 |
| 2017/0034011 | A1* | 2/2017 | Butler | H04L 41/30 |
| 2017/0091750 | A1* | 3/2017 | Maim | H04L 9/30 |

OTHER PUBLICATIONS

Blaze, M., et al., "Divertible Protocols and Atomic Proxy Cryptography", Advances in Cryptology, Proceedings of the International Conference on the Theory and Application of Crytographic Techniques, May 31-Apr. 4, 1998, pp. 1-18.

Camenisch, J., et al., "A Framework for Practical Universally Composable Zero-Knowledge Protocols", Proceedings of the 17th International Conference on the Theory and Application of Cryptology and Information Security, Dec. 1-8, 2011, pp. 1-18.

U.S. Appl. No. 14/970,966, filed Dec. 16, 2015.
U.S. Appl. No. 14/752,230, filed Jun. 26, 2015.
U.S. Appl. No. 14/858,389, filed Sep. 18, 2015.

* cited by examiner

CRYPTOGRAPHICALLY ASSURED ZERO-KNOWLEDGE CLOUD SERVICE FOR COMPOSABLE ATOMIC TRANSACTIONS

BACKGROUND

The present invention generally relates to cloud services, and more particularly executing cloud services while maintaining privacy of users.

Cryptographically verifiable computing, using technology known as Probabilistically Checkable Proofs (PCPs) and Succinct variants such as zkSNARK and SCIP, have been known in the art for years. These cryptographically verifiable computing technologies have yet to gain popular commercial use because they have such high overhead. This technology has the ability to enable two mutually untrusting parties to transact with each other with a verified utility function which provides a high probability guarantee of the integrity of the function. Unfortunately only very simple and concise programs can be implemented, run, and verified quickly; and as a result, researchers have focused on improving efficiency with the intention of making the technology useful for general-purpose programming.

SUMMARY

Disclosed is a method, system, and computer program product for practical commercial implementation of cryptographically verifiable computing, by embodying it in the form of elemental microservices on the cloud. The present invention allows the elemental microservices to be composed into atomic transactions by participating in an inventive two-phase commit protocol of assured atomicity of execution. The two-phase commit protocol begins with selecting computational resources based on a request. The second phase is to wait until authorization, i.e. voting, is received from each and every participant based on the request. The participant can be the cloud microservices i.e. the transaction, or the end user devices themselves or a combination of both.

These elemental cloud microservices can be composed together with regular relatively untrusted cloud services in order to improve integrity, privacy, and general security. The present invention claims a set of elemental micro-transactions which, when provided as services on the cloud, enable trusted transactions between mutually untrusting parties, and create the possibility of trusting cloud services even when the cloud provider is not trusted. The method employed is to use verifiable computing in very small programs that can be instantiated on the cloud to perform a specific job, and upon program completion return to the one or more clients not only a program exit state but a mathematical proof that the program was executed as advertised and untampered-with. In a preferred embodiment, the source code of each service is made public, so users of these services can verify for themselves that the program executed as advertised. No trust is required in the integrity of the provider organization or of any participant in such a transaction—the program provides its own irrefutable mathematical proof of valid execution.

Disclosed is a novel system, computer program product, and method for providing a trusted network based service. The method running on a server, for example as a cloud server, includes receiving a request from a first user device and a second user device. The request includes one or more inputs to perform a transaction. Based upon the request, selecting one or more computational resources from a set of a plurality of computational resources using zero-knowledge verifiable computing. In response to receiving authorization from each of the computational resources that they are capable of performing the zero-knowledge verifiable computing transactions to carry out at least a portion of the request, executing the program using zero-knowledge verifiable computing to carry out the request using a zero-knowledge protocol to ensure privacy of the first user device and the second user device.

The method may also include sending a notification out to the first user device and the second user device to request committing the request to the computational resources. In response to receiving authorization from each of the first user device and the second user device, executing the program using zero-knowledge verifiable computing to carry out the request using a zero-knowledge protocol to ensure privacy of the first user device and the second user device.

In another example, authorization is received from the each cloud microservice itself rather than, or in addition to each participating user device. Sending to the first user device and the second user device an output of the request along with proof from the zero-knowledge protocol that the program was executed without alteration is sent to the first user device and the second user device.

The zero-knowledge verifiable computing is any of succinct computational integrity and privacy (SCIP) technique, zero-knowledge succinct non-interactive argument of knowledge (zk-snark) technique, or a probabilistically checkable proof (PCP) technique. The proof can be whether the program is using at least one of trusted computing, secure boot with attestation, or a combination or derivative thereof.

In one example, the stateless transaction based on combinational logic is one of a set of a plurality of stateless transactions using zero-knowledge verifiable computing. These stateless transactions are configured to receive inputs and send outputs in less than a second, which is referred to as a "microtransaction." Stateful transactions may also be used along with the stateless transactions. Combinational logic in one example includes an inequality function, a Boolean function, a RESTful application programming interface (API), an arithmetic function or a combination thereof.

This microtransaction service can be fee based in which the payment including cryptocurrency such as Bitcoin.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

The present invention provides a cloud service. The cloud service receives request to perform a transaction that includes one or two inputs. Based upon the request, selecting one or more computational resources from a set of a plurality of computational resources using zero-knowledge verifiable computing. Sending a notification out to the first user device and the second user device to request committing the request to the computational resources. In response to receiving authorization from each of the first user device and the second user device, executing the program using zero-knowledge verifiable computing to carry out the request using a zero-knowledge protocol to ensure privacy of the first user device and the second user device. Sending to the first user device and the second user device an output of the request.

Non-Limiting Definitions

The terms "a", "an" and "the" are intended to include the plural forms as well, unless the context clearly indicates otherwise.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "atomic transaction" is used to mean a series of operations, typically on a file, database, or other resource, such that either all occur, or nothing occurs. The series of operations cannot be divided apart and executed partially from each other, which makes the series of operations "indivisible", hence the name. A guarantee of atomicity prevents updates to the database occurring only partially, which can cause greater problems than rejecting the whole series outright. In other words, atomicity means indivisibility and irreducibility.

The term "integrity" or "integrity of content" is used to mean using digital rights management (DRM) systems to guard against piracy and to ensure license conditions are met. The DRM system provides access control to the multimedia content. The access controls typically include one or more of viewing, storing, copying controls, or a combination thereof.

The term "stateless transaction" is used to mean is a transaction that treats each request as an independent transaction that is unrelated to any previous request so that the communication consists of independent pairs of request and response. A stateless protocol does not require the server to retain session information or status about each communications partner for the duration of multiple requests. In contrast, a protocol which requires keeping of the internal state on the server is known as a stateful protocol.

The phrase "verifiable computing" in cryptography, is a method by which one party, the prover, or as used in this patent a "user", can prove to another party, the verifier as used in this patent a "content provider" or "service provider" providing content that a program has been or is being executed correctly and without modification or tampering.

A "zero-knowledge protocol", in cryptography, is a method by which one party, the prover, or as used in this patent a "user", can prove to another party, the verifier as used in this patent a "content provider" or "service provider" providing content that a given statement is true, without conveying any information apart from the fact that the statement is indeed true.

The phrase "zero-knowledge verifiable computing" is a method of verifiable computing which can also function with a zero-knowledge protocol. Examples of zero-knowledge verifiable computing are succinct computational integrity and privacy (SCIP) technique, zero-knowledge succinct non-interactive argument of knowledge (zk-snark) technique, and the zero-knowledge protocol with a probabilistically checkable proof (PCP) technique.

Operating Environment

Figure 1:
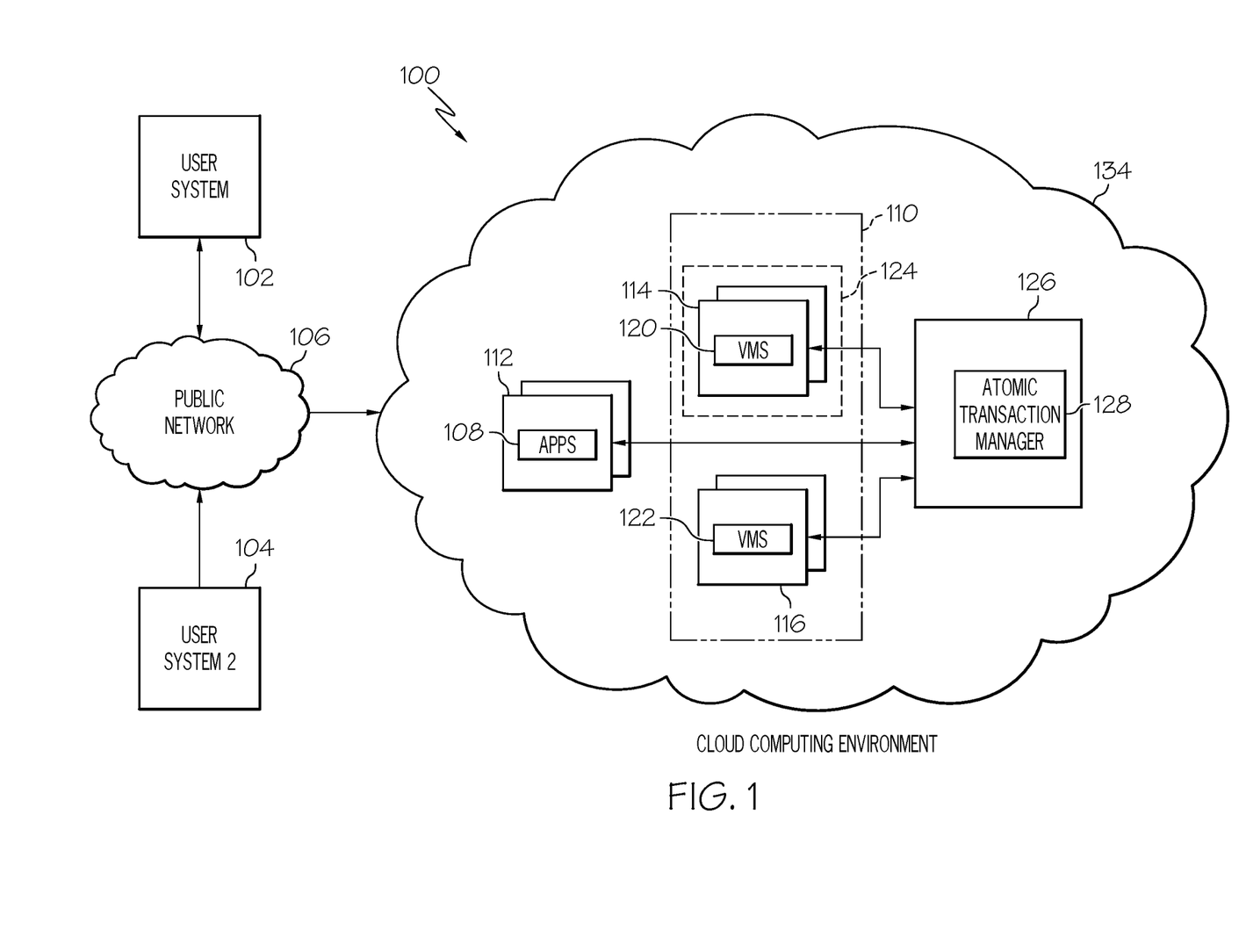
FIG. 1 is a block diagram illustrating one example of an operating environment according to one embodiment of the present invention.

FIG. 1 shows one example of an operating environment 100 for provisioning resources in a cloud computing environment for multi-tier cloud applications. It should be noted that although the following discussion is directed to a cloud computing environment various embodiment are not limited to such environment and are application to non-cloud computing environments as well. In particular, FIG. 1 shows one or more client/user systems 102, 104 communicatively coupled to one or more cloud computing environments 104 via a public network 106 such as the Internet. The user systems 102, 104 can include, for example, information processing systems such as desktop computers, laptop computers, servers, wireless devices (e.g., mobile phones, tablets, personal digital assistants, etc.), and the like.

The user systems 102, 104 access the cloud computing environment 106 via one or more interfaces (not shown) such as a web browser, application, etc. to utilize resources provided by the environment 104. For example, FIG. 1 shows a plurality of resources such as applications 108 and computing resources 110 available within the cloud computing environment 134. Computing resources 110 include but are not limited to, processing, storage, networking, and other fundamental computing resources. Resources 108, 110 are provided by and/or are hosted on a plurality of physical information processing systems 112, 114, 116 and/or a plurality of virtual machines 118, 120 being executed by physical systems 114, 116. A plurality of physical systems 112, 114, 116, virtual machines 120, 122, or a combination thereof grouped together for providing a resource(s) is referred to as a "cluster" 124.

In one example, a cloud user (via a user systems 102, 104) utilizes the cloud environment 134 to deploy a multi-tier web application. In this example, a multi-tier web application is an application (software designed to enable a user to perform a given task) accessible over a network whose presentation, logic (application processing), and data storage processes are performed at physically separate tiers. For example, the presentation processes can be performed on a web server tier; the application processing can be performed on an application server tier; and the data storage processes can be performed on a database server tier. Each of the web server, application server, and database server tiers can be comprised of one or more of the information processing systems 114, 116, and/or VMs 120, 122 in the cloud environment 134.

The cloud computing environment 134 further comprises one or more information processing systems 126 that comprise atomic transaction manager 128. It should be noted that the information processing system 126 is not required to reside within the cloud environment 106. In one example, the atomic transaction manager 128 provisions micro-transactions or transactions that include one or more inputs to perform a stateless transaction based on combinational logic, an output of the combinational logic is a function of only the one or more inputs. In another example the atomic transaction manager 128 provisions transactions that are stateful as well.

In one embodiment, the atomic transaction manager 128 collects a first set of performance information for a base allocation of computing resources across multiple server tiers in the plurality of sever tiers for a set of workloads.

Atomic Transaction Manager

Figure 2:
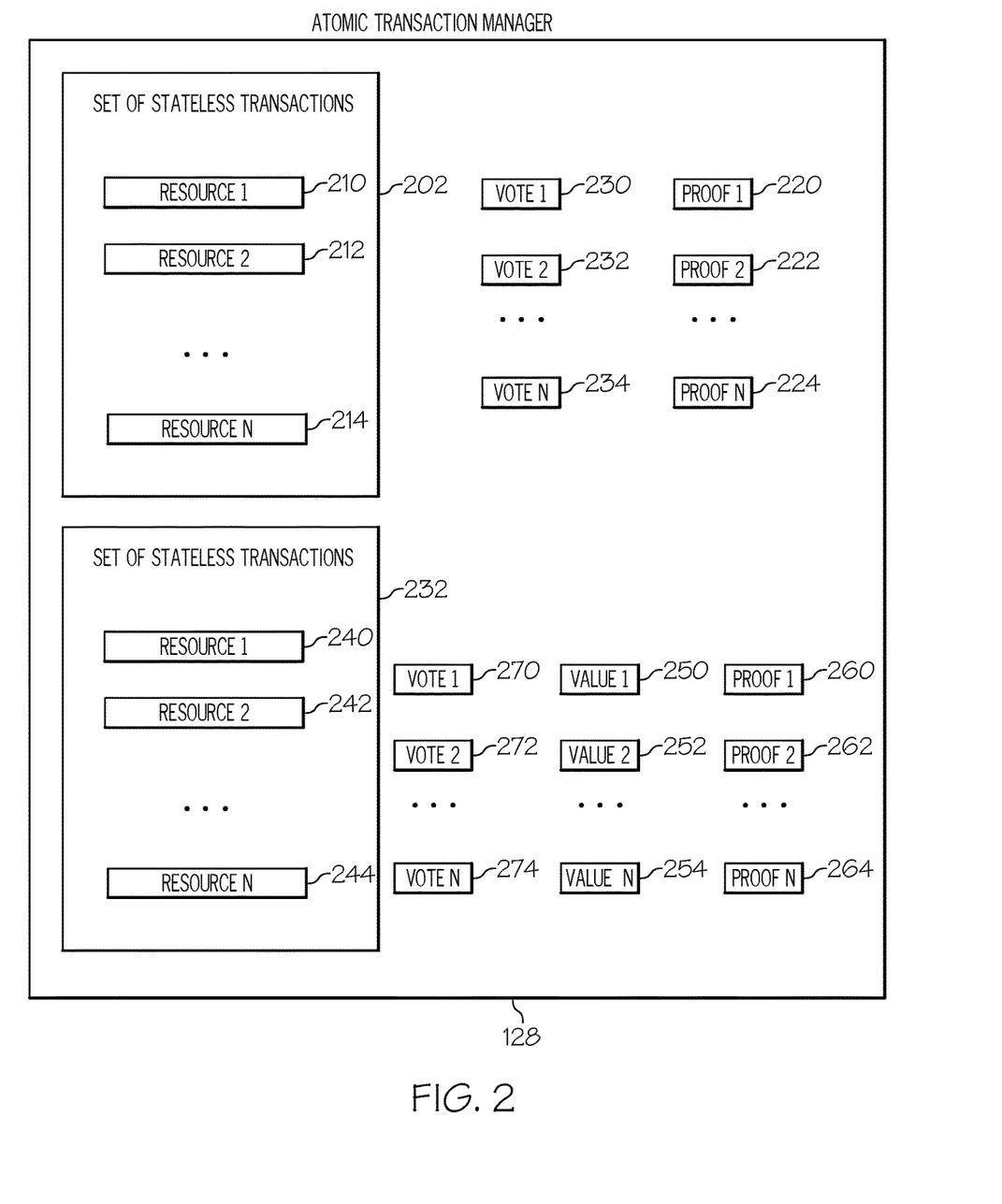
FIG. 2 is a block diagram illustrating a detailed view of the atomic transaction manager of FIG. 2.

The following is a more detailed discussion regarding the atomic transaction manager 128. Shown is a set of atomic transactions 202. Each of the atomic transactions are based on a shared pool of configurable computing resources (e.g., networks, network bandwidth, servers, processing, memory, storage, applications, virtual machines, and services). Each of the atomic transactions in the set of atomic transactions 202 are designed to execute only once an authorization is received from each user device participating in the transaction. Also shown is a set of proofs 250, 252, 254. These proofs are used as reference or dynamically created to send to the user systems that the transaction was successfully executed using zero-knowledge verifiable computing with a zero-knowledge protocol. This proves that the atomic transaction was executed to the user systems. And during the execution using the resources that were allocated that the result is conveyed without any information apart from the fact that the result has been executed without alteration. Examples of atomic transactions based on combinational logic include any of an inequality function, a Boolean function; a RESTful application programming interface (API), an arithmetic function or a combination.

Also shown are a series of votes, or authorizations 230, 232, 234, 270, 272, 274 for each of the resources 210, 212, 214, 240, 242, 244. These votes represent that the computational resource is available to carry out a portion of a zero-knowledge computing transaction as the first phase of the two phase commit-execute process As is discussed further below, these proofs 220, 222, and 224 have been executed on a zero-knowledge verifiable computing platform. In one example, the set of atomic transaction 202 along with the combinational logic and proofs conveying that it is based on a zero-knowledge protocol running on a zero-knowledge verifiable computing platform is based on open-source software. Using this approach anyone has access to the source code, through a license to study, change, and distribute the software to anyone and for any purpose. This provides security, affordability, transparently, flexibility as part of the value proposition of open source.

In one example besides the set of stateful transactions 232 in additional to the atomic transactions. In this example, each of the stateful transactions are based on a set of combinational logic 240, 242, 244 along with one or more values 250, 252, 254 previously computed or stored. The output of each combinational logic is only a function of one or more inputs and any previous stored values 250, 252, 254. Each of the stateful transactions in the set of stateful transactions 232 are designed to execute quickly, typically in less than a second. Also shown is a set of proofs 260, 262, 264. These proofs are used as reference or dynamically created to send to the user systems that the transaction was successfully executed using zero-knowledge verifiable computing with a zero-knowledge protocol. This proves that the atomic transaction was executed to the user systems. And during the execution of the given combinational logic that the result is conveyed without any information apart from the fact that the result has been executed without alteration. Examples of atomic transactions based on combinational logic include any of an inequality function, a Boolean function; a RESTful application programming interface (API), an arithmetic function or a combination.

As is discussed further below, these proofs 220, 222, and 224 have been executed on a zero-knowledge verifiable computing platform. In one example, the set of atomic transaction 202 along with the combinational logic and proofs conveying that it is based on a zero-knowledge protocol running on a zero-knowledge verifiable computing platform is based on open-source software. Using this approach anyone has access to the source code, through a license to study, change, and distribute the software to anyone and for any purpose. This provides security, affordability, transparently, flexibility as part of the value proposition of open source.

Atomic Transaction Manager Flow

Figure 3:
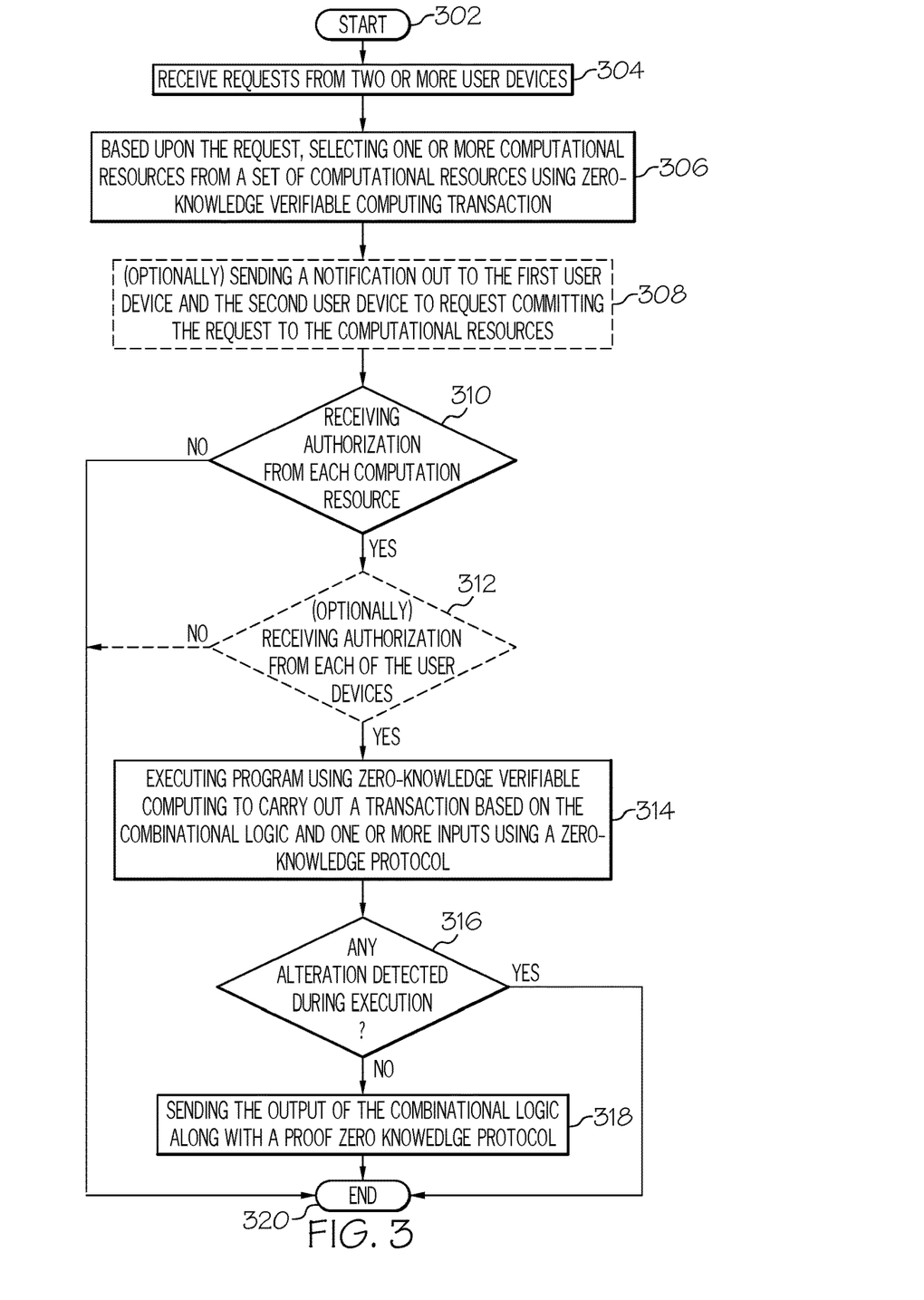
FIG. 3 is a flow diagram illustrating multimedia content control by content providers and to ensure privacy by content users.

The process starts in step 302 and immediately proceeds to step 304. In step 304, a request is received from two or more user devices. The request includes one or more inputs to perform an atomic transaction. In one example the atomic transaction is based on combinational logic, an output of the combinational logic is a function of only the one or more inputs i.e. stateless. In another example, the transaction is stateful. In step 306, based upon the request, selecting a resource from a set of computational resources using zero-knowledge verifiable computing to carry out the transaction. Next step 308, is an optional step in which a notification is set out to the first user device and the second user device to request committing the request for computational resources.

In step 310, a test is made to see if authorization from each and every one of the computational resources that have been selected are committed to carrying out the request using zero-knowledge verifiable computing. If one or more of the computational resources cannot commit, the process flows to step 320 to end. Otherwise, the process continued to optional step 312.

In optional step 312, a test is made to determine if an authorization is received from each and every user device that is participating in the requested transaction is received. If authorization is received from each and every user device the flow proceeds to step 314. Otherwise, if authorization is not received from each and every user device in step 314, the process proceeds to step 316. An optional notification can be sent to one or more of the user devices. (Not shown).

In step 314 the program is executed using zero-knowledge verifiable computing to carry out the transaction. The transaction may be based on combinational logic. The transaction includes one or more inputs using a zero-knowledge protocol to ensure privacy of the first user device and the second user device.

Next, in step 316 a decision is made whether there was an alteration detected during execution. If the program executed without alteration the process continues to step 318 is sent to an output of the combinational logic along with proof from the zero-knowledge protocol that the combinational logic was executed to the first user device and the second user device. The process ends in step 320. Otherwise if there is an alteration detected during execution in step 320 the process continues to step 316 in which a notification that the zero-knowledge verifiable computing was not successful and the process ends in step 320.

This atomic transaction manager 128 can be run as part of a cloud based service in which participants pay. For example in a dating application, a first user may want to know if a second user is interested.

Inputs between parties that are mutually untrusting may be in the clear or in obscured form, using obscuration that is functionally equivalent to a hash function which the microservice or microtransaction reverse but the mutually untrusting parties cannot. For example, using a data service example two potential dating partners have "Avatar" software representing their interests and interacting through the neutral arbitration provided by a Zero Knowledge Verifiable microservice. The interaction proceeds thus:
1. User 1 and User 2 use avatars to engage the cloud-based microservice and agree on which instance to use.
2. Both users provide the cloud-based microservice with their input to the question "Are you interested in dating the other user" in obscured form.
3. Both users provide the input to each other's avatars for verification in a later step.
4. The cloud-based microservice performs a Boolean AND on the content of the two users' obscured inputs and the program exits with the result (1 or 0), providing both users with the output condition and the zero-knowledge verifiable and zero-knowledge protocol proof of execution.
5. Both avatars are informed of the result, and as both possess both inputs, they can verify that the code was executed untampered-with. This optionally includes verifying that no element of the program stored the results of the program or any of the input, and optionally that it overwrote the contents of memory where the transaction was performed before exiting, in order to provide an assurance of privacy from the Cloud Provider which hosted the microservice.
6. Now both parties know if and only if they both agreed that they were interested in each other. If either party was not interested, they never learn whether or not the other party was interested. The transaction thus takes place in Zero Knowledge.

Similarly, other Cloud services can take place in Verifiable Zero Knowledge using these cloud-based microservices. For example, a cloud-based microservices can procure service from a third party Cloud Storage Service or Database as a Service and be used to create a robust transparent escrow service. The service generates an encryption key or seed using a randomization function and, and sends the escrowed sensitive data to the third party storage or database, and provides two halves of the key to the two users. The users may now use a companion microservices to reconstitute the full key if and only if both users agree (using the Boolean AND of the example above) or based on some other simple function such as verifying the reputation of a colleague.

Cryptographically Trusted Base Platform

The atomic transaction manager 128 tests to ensure that the content is accessed only on servers or computer systems, and client devices including assured workstations, mobile devices, etc., even to specifying maximum display resolution, acceptable device types and number of screens, geography (if a reliable source of this information is available through the executing device) or any other specifications—all the preceding of which can be tested by the content media player application using trusted computing and/or secure boot attestation of the program platform. In this case, the atomic transaction manager 128 performs a standard trusted computing group-style attestation of the base platform on which the program is to be run, and fails to execute if the platform is in an untrusted state. Even more robust assurance against tampering can be provided by requirement of a device with specific protections against real-time tampering in memory such as those available in Intel SGX or IBM Power ACM or similar architectures.

Generalized Computing Environment

Figure 4:
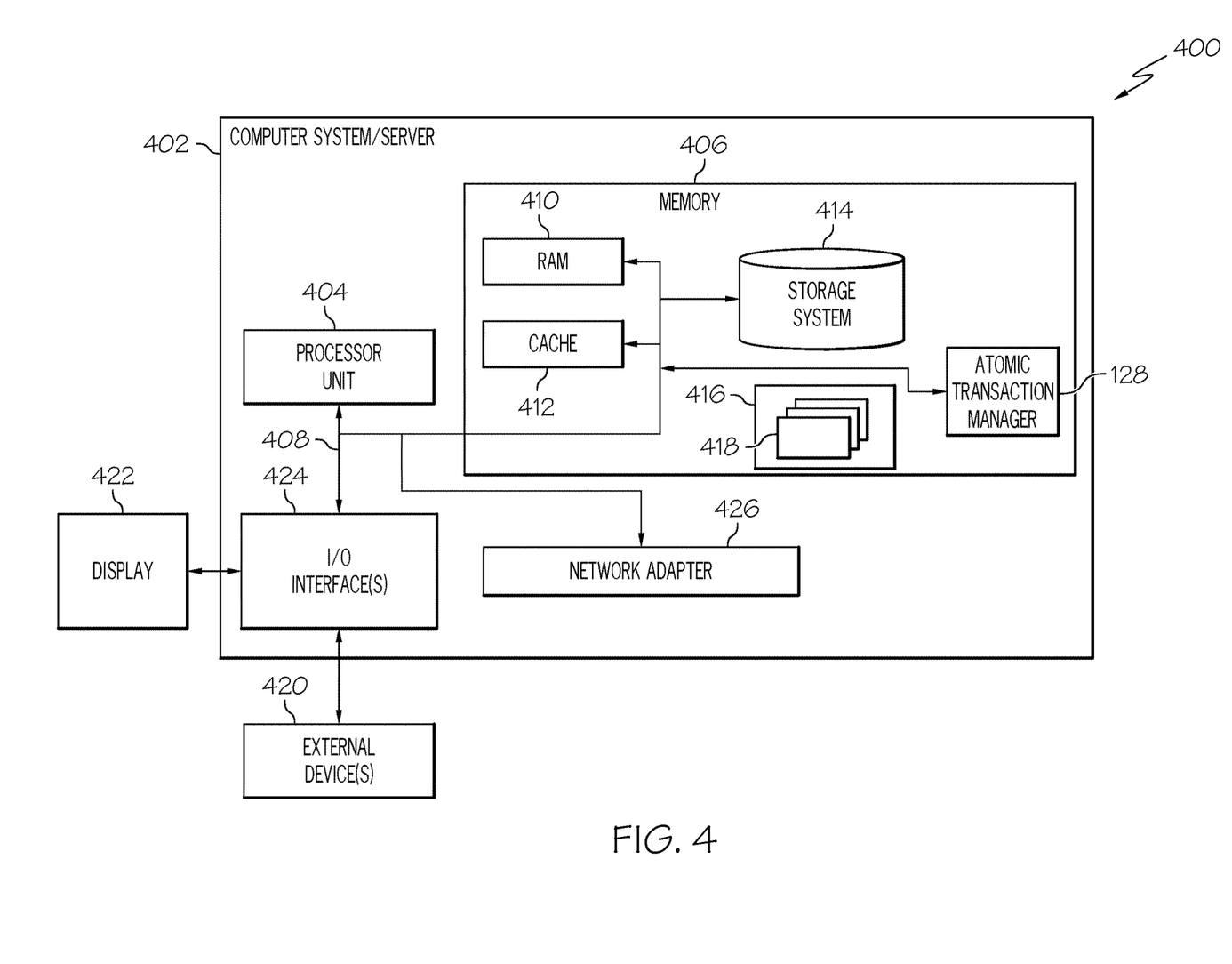
FIG. 4 illustrates one example of a cloud computing node according to one embodiment of the present invention.

FIG. 4 illustrates one example of a processing node 400 for operating the atomic transaction manager 128 and is not intended to suggest any limitation as to the scope of use or functionality of embodiments of the invention described herein. Regardless, the computing node 400 is capable of being implemented and/or performing any of the functionality set forth hereinabove.

In computing node 400 there is a computer system/server 402, which is operational with numerous other general purpose or special purpose computing system environments or configurations. Examples of well-known computing systems, environments, and/or configurations that may be suitable for use with computer system/server 402 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 402 in cloud computing node 400 is shown in the form of a general-purpose computing device. The components of computer system/server 402 may include, but are not limited to, one or more processors or processing units 404, a system memory 406, and a bus 408 that couples various system components including system memory 406 to processor 404.

Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406, in one embodiment, implements the block diagram of FIG. 2 and the flow chart of FIG. 3. The system memory 406 can include computer system readable media in the form of volatile memory, such as random access memory (RAM) 410 and/or cache memory 412. Computer system/server 402 may further include other removable/non-removable, volatile/non-volatile computer system storage media. By way of example only, storage system 414 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of various embodiments of the invention.

Program/utility 416, having a set (at least one) of program modules 418, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. Program modules 418 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. The computer program product is typically non-transitory but in other examples it may be transitory.

Computer system/server 402 may also communicate with one or more external devices 1020 such as a keyboard, a pointing device, a display 422, etc.; one or more devices that enable a user to interact with computer system/server 402; and/or any devices (e.g., network card, modem, etc.) that enable computer system/server 402 to communicate with one or more other computing devices. Such communication can occur via I/O interfaces 424. Still yet, computer system/server 402 can communicate with one or more networks such as a local area network (LAN), a general wide area network (WAN), and/or a public network (e.g., the Internet) via network adapter 426. As depicted, network adapter 426 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

Cloud Computer Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on atomic, statelessness, low coupling, modularity, and semantic interoperability. At the heart of cloud computing is an infrastructure comprising a network of interconnected nodes.

Figure 5:
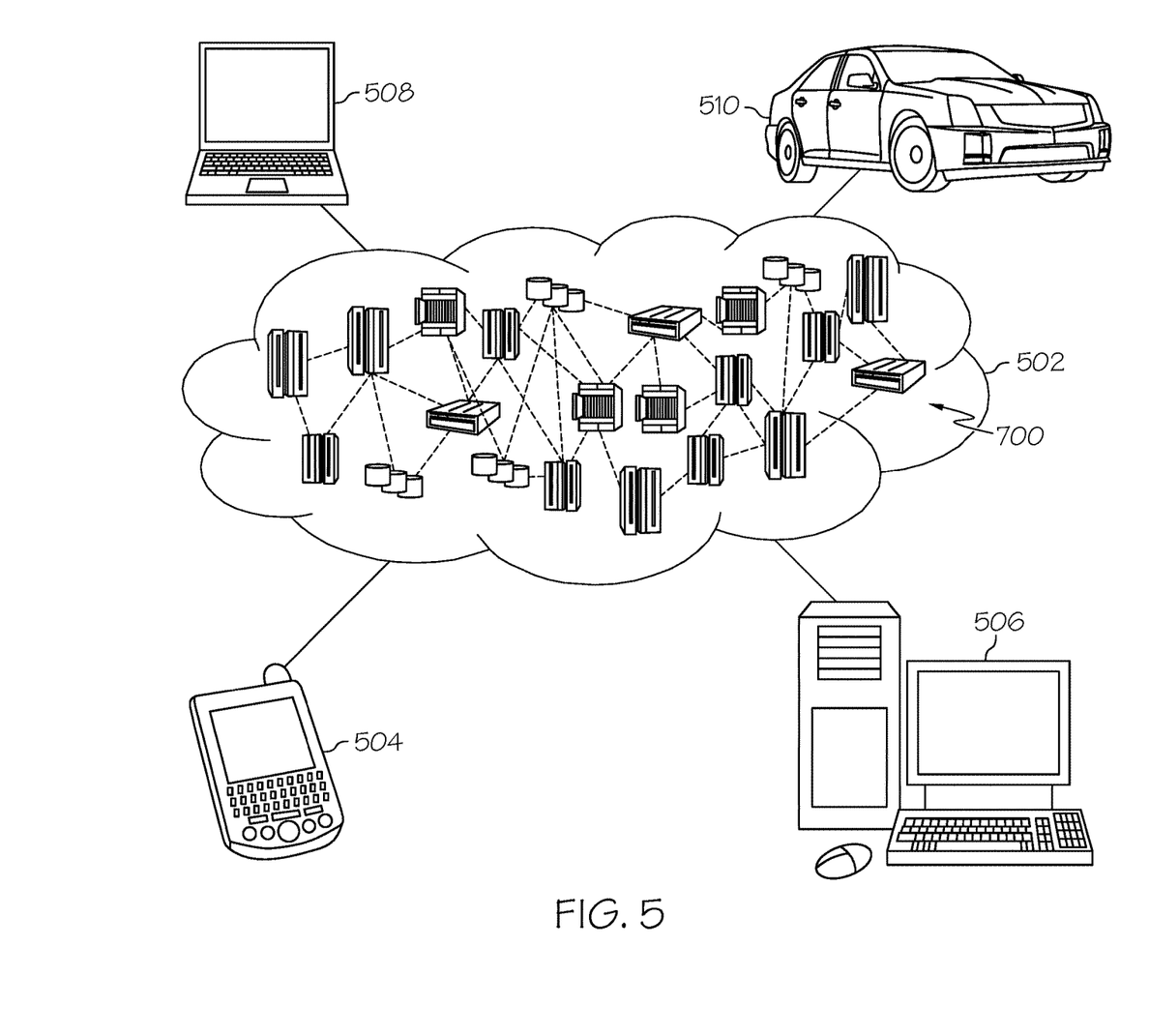
FIG. 5 illustrates one example of a cloud computing environment according to one example of the present invention.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
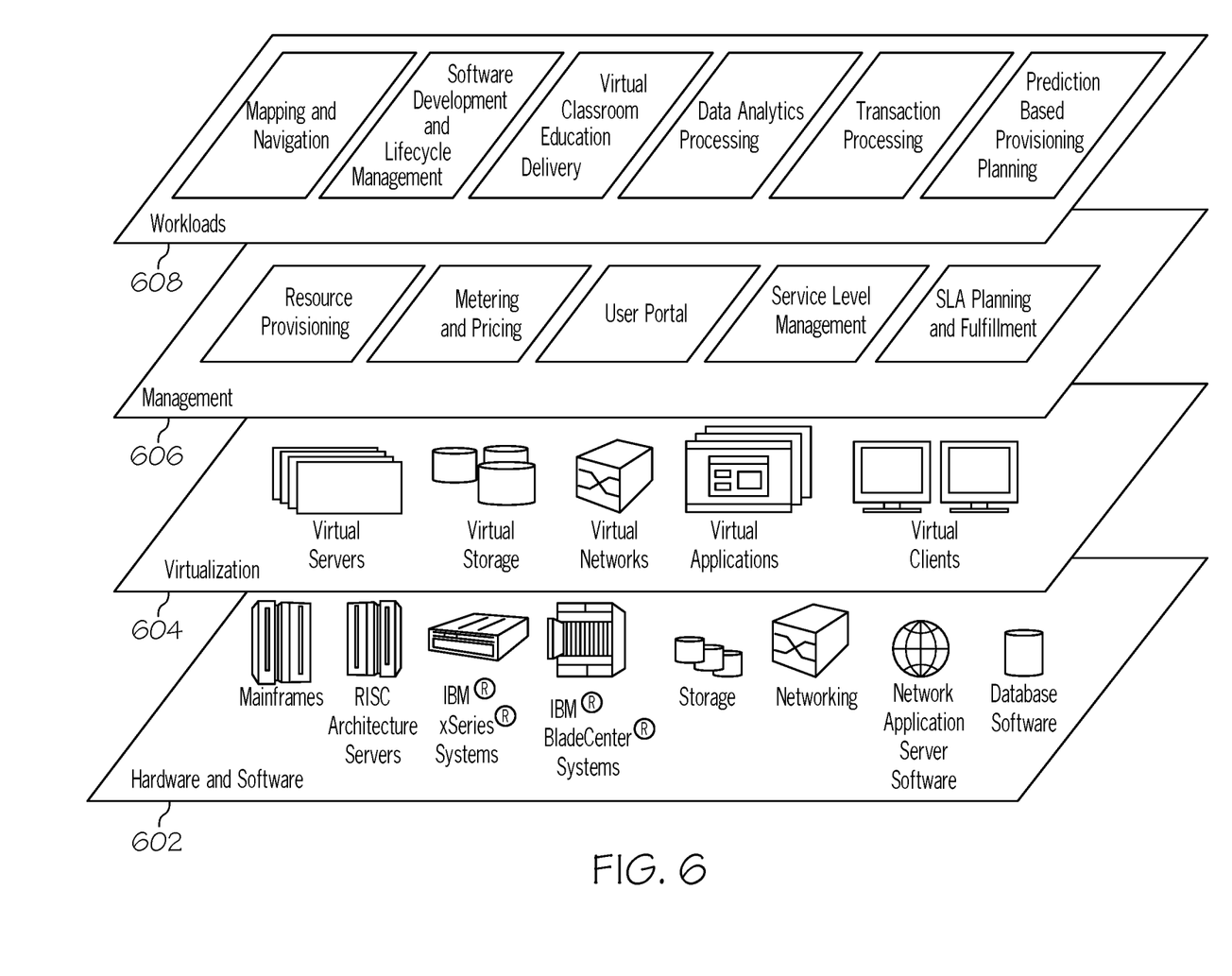
FIG. 6 illustrates an abstraction model layers according to one example of the present invention.

Referring now to FIG. 6, a set of functional abstraction layers provided by cloud computing environment 550 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and for delivering services from a server to ensure multimedia content control by content providers (i.e. reduce piracy) and to ensure privacy by content users 696.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for providing a network based service, the method on a server comprising:
    receiving a request using a zero-knowledge protocol from at least a first user device for a network based service with a second user device, the request including one or more inputs, and the zero-knowledge protocol is used to ensure privacy of the first user device and the second user device;
    based upon the request, selecting one or more computational resources from a set of a plurality of computational resources using zero-knowledge verifiable computing to carry out the request;
    receiving authorization from each of the computational resources that they are capable of performing the request as an indivisible and irreducible atomic stateless transaction;
    in response to receiving authorization from each of the computational resources that they are capable of performing the request, executing a program to generate each of
    i) a cryptographic first proof based on the zero-knowledge protocol,
    ii) a second proof that an output from combinational logic processing was executed without any alteration detected and unrelated to any previous request and the second proof is based on a trusted computing environment that requires secure boot with attestation, and
    iii) the output generated by the combinational logic processing the one or more inputs as an indivisible and irreducible atomic stateless transaction;
    sending to the first user device and the second user device i) the output of the combinational logic processing, ii) the cryptographic first proof from the zero-knowledge protocol, and iii) the second proof based on the trusted computing environment;
    validating, at each of the first user device and the second user device, whether each of i) the cryptographic first proof and ii) the second proof is valid, the first proof is validated by executing a randomized algorithm using a bounded amount of randomness and reading a bounded number of bits of the first proof;
    confirming, at each of the first user device and the second user device, that both the cryptographic first proof and the second proof are valid; and
    based on the cryptographic first proof and the second proof being confirmed, each of the first user device and the second user device designating the output as verified.

2. The method of claim 1, further comprising:
    sending a notification out to the first user device and the second user device to request committing the request to the computational resources.

3. The method of claim 1, wherein the one or more computational resources including anyone of processors, memory, bandwidth and non-volatile storage.

4. The method of claim 1, wherein the combinational logic processing includes a set of one or more stateful transactions.

5. The method of claim 1, wherein the combinational logic processing includes one of:
    an inequality function;
    a Boolean function;
    a RESTful application programming interface (API);
    an arithmetic function; or
    a combination thereof.

6. The method of claim 1, further including:
    receiving a payment from at least one of the first user device and the second user device as payment for executing the program.

7. The method of claim 6, wherein the receiving the payment further includes receiving a cryptocurrency as payment.

8. The method of claim 7, wherein the receiving the cryptocurrency from at least one of the first user device and the second user device is payment for executing the program.

9. The method of claim 8, wherein the receiving a cryptocurrency from at least one of the first user device and the second user device includes receiving a Bitcoin payment.

10. The method of claim 1, wherein the zero-knowledge verifiable computing is succinct computational integrity and privacy (SCIP) technique.

11. The method of claim 1, wherein the zero-knowledge verifiable computing is zero-knowledge Succinct non-interactive argument of knowledge (zk-snark) technique.

12. A system for providing a network based service, the system comprising:
    a memory;
    a processor communicatively coupled to the memory, where the processor is configured to perform
    receiving a request using a zero-knowledge protocol from at least a first user device for a network based service with a second user device, the request including one or more inputs, and the zero-knowledge protocol is used to ensure privacy of the first user device and the second user device;
    based upon the request, selecting one or more computational resources from a set of a plurality of computational resources using zero-knowledge verifiable computing to carry out the request;
    receiving authorization from each of the computational resources that they are capable of performing the request as an indivisible and irreducible atomic stateless transaction;
    in response to receiving authorization from each of the computational resources that they are capable of performing the request, executing a program to generate each of
    i) a cryptographic first proof based on the zero-knowledge protocol,
    ii) a second proof that an output from combinational logic processing was executed without any alteration detected and unrelated to any previous request and the second proof is based on a trusted computing environment that requires secure boot with attestation,
    iii) the output generated by the combinational logic processing the one or more inputs as an indivisible and irreducible atomic stateless transaction;
    sending, using the zero-knowledge protocol, to the first user device and the second user device i) the output of the combinational logic processing, ii) the cryptographic first proof from the zero-knowledge protocol, and iii) the second proof based on the trusted computing environment;
    validating, at each of the first user device and the second user device, whether each of i) the cryptographic first proof and ii) the second proof is valid, the first proof is validated by executing a randomized algorithm using a bounded amount of randomness and reading a bounded number of bits of the first proof;

confirming, at each of the first user device and the second user device, that both the cryptographic first proof and the second proof are valid; and based on the cryptographic first proof and the second proof being confirmed, each of the first user device and the second user device designating the output as verified.

13. The system of claim 12, further comprising:
sending a notification out to the first user device and the second user device to request committing the request to the computational resources.

14. The system of claim 12, wherein the one or more computational resources including anyone of processors, memory, bandwidth and non-volatile storage.

15. A non-transitory computer program product for providing a network based service comprising a computer readable storage medium having computer readable program code embodied therewith, the computer readable program code, when executed by a processor, cause the processor to perform:

receiving a request using a zero-knowledge protocol from at least a first user device for a network based service with a second user device, the request including one or more inputs, and the zero-knowledge protocol is used to ensure privacy of the first user device and the second user device;

based upon the request, selecting one or more computational resources from a set of a plurality of computational resources using zero-knowledge verifiable computing to carry out the request;

receiving authorization from each of the computational resources that they are capable of performing the request as an indivisible and irreducible atomic stateless transaction;

in response to receiving authorization from each of the computational resources that they are capable of performing the request, executing a program to generate each of i) a cryptographic first proof based on the zero-knowledge protocol, ii) a second proof that an output from combinational logic processing was executed without any alteration detected and unrelated to any previous request and the second proof is based on a trusted computing environment that requires secure boot with attestation, iii) the output generated by combinational logic processing the one or more inputs as an indivisible and irreducible atomic stateless transaction;

sending, using the zero-knowledge protocol, to the first user device and the second user device i) the output of the combinational logic processing, ii) the cryptographic first proof from the zero-knowledge protocol, and iii) the second proof based on the trusted computing environment;

validating, at each of the first user device and the second user device, whether each of i) the cryptographic first proof and ii) the second proof is valid, the first proof is validated by executing a randomized algorithm using a bounded amount of randomness and reading a bounded number of bits of the first proof;

confirming, at each of the first user device and the second user device, that both the cryptographic first proof and the second proof are valid; and based on the cryptographic first proof and the second proof being confirmed, each of the first user device and the second user device designating the output as verified.

16. The non-transitory computer program product of claim 15, wherein the one or more computational resources including anyone of processors, memory, bandwidth and non-volatile storage.

17. The method of claim 1, further includes overwriting memory in which the program has been executed with randomized data to provide assurance of privacy.

18. The system of claim 12, further includes overwriting memory in which the program has been executed with randomized data to provide assurance of privacy.

* * * * *